United States Patent [19]

Smith et al.

[11] Patent Number: 4,635,761

[45] Date of Patent: Jan. 13, 1987

[54] DISC BRAKE PARKING CARTRIDGE RETENTION DEVICE

[75] Inventors: Roger L. Smith, Niles, Mich.; Daniel L. Bolenbaugh, South Bend, Ind.

[73] Assignee: Allied Corporation, Morristown, N.J.

[21] Appl. No.: 771,869

[22] Filed: Aug. 30, 1985

[51] Int. Cl.⁴ .................. F16D 55/26; F16D 65/14
[52] U.S. Cl. ............................ 188/72.6; 24/545; 24/555; 74/471 R; 74/519; 188/2 D; 188/72.7; 188/72.9; 188/106 F
[58] Field of Search ............. 188/72.6, 72.9, 72.7, 188/72.8, 106 F, 71.8–71.9, 2 D, 72.1, 79.5 K, 324, 329, 330, 332, 339, 196 BA; 74/471 R, 519, 501 D, 501 E, 501 F, 501 R; 24/555, 545

[56] References Cited

U.S. PATENT DOCUMENTS

| | | | |
|---|---|---|---|
| 3,115,953 | 12/1963 | Péras | 188/72.9 X |
| 3,253,681 | 5/1966 | Butler | 188/72.9 |
| 3,406,793 | 10/1968 | Buyze | 188/106 FX |
| 3,507,367 | 4/1970 | Brown et al. | 188/106 F |
| 3,546,962 | 12/1970 | Ruhala | 74/501 D |
| 3,680,663 | 8/1972 | Kine | 188/72.9 X |
| 3,701,400 | 10/1972 | Burnett et al. | 188/72.6 |
| 3,871,493 | 3/1975 | Mathias | 188/2 D X |
| 3,927,736 | 12/1975 | Bergles | 188/72.8 X |
| 4,064,973 | 12/1977 | Deem et al. | 188/71.9 X |
| 4,406,352 | 9/1983 | Scott et al. | 188/72.8 |
| 4,512,445 | 4/1985 | Runkle et al. | 188/71.9 |
| 4,544,045 | 10/1985 | Runkle | 188/106 F X |

FOREIGN PATENT DOCUMENTS 2045877 11/1980 United Kingdom .

Primary Examiner—Douglas C. Butler
Attorney, Agent, or Firm—Larry J. Palguta; Ken C. Decker

[57] ABSTRACT

The disc brake (10) includes a parking cartridge device (28) which transfers reaction forces of the mechanical parking actuator (36) directly to the caliper housing (12) and also provides support and guidance for a cable (90) attached to lever arms (70) of the mechanical parking actuator (36). The mechanical parking actuator (36) is disposed within an opening (34) of the parking cartridge housing (30), the parking cartridge housing (30) having a plurality of through openings (42) so that bolts (50) may be secured at one end to the caliper housing (12) and at the other end to a bracket (60) which abuts an end (33) of the parking cartridge housing (30). An end plug (48) encloses the opening (34) and abuts the bracket (60) so that reaction forces from the mechanical parking actuator (36) are transmitted directly to the bracket (60), bolts (50), and caliper housing (12), and the parking cartridge housing (30) does not receive any reaction forces so that it may be made of a lighter weight material and of a smaller construction. The mechanical parking actuator (36) includes a pair of lever arms (70) which are clasped together by a U-shaped retainer (80) or pin (100) which secure the cable (90) to the lever arms (70).

22 Claims, 4 Drawing Figures

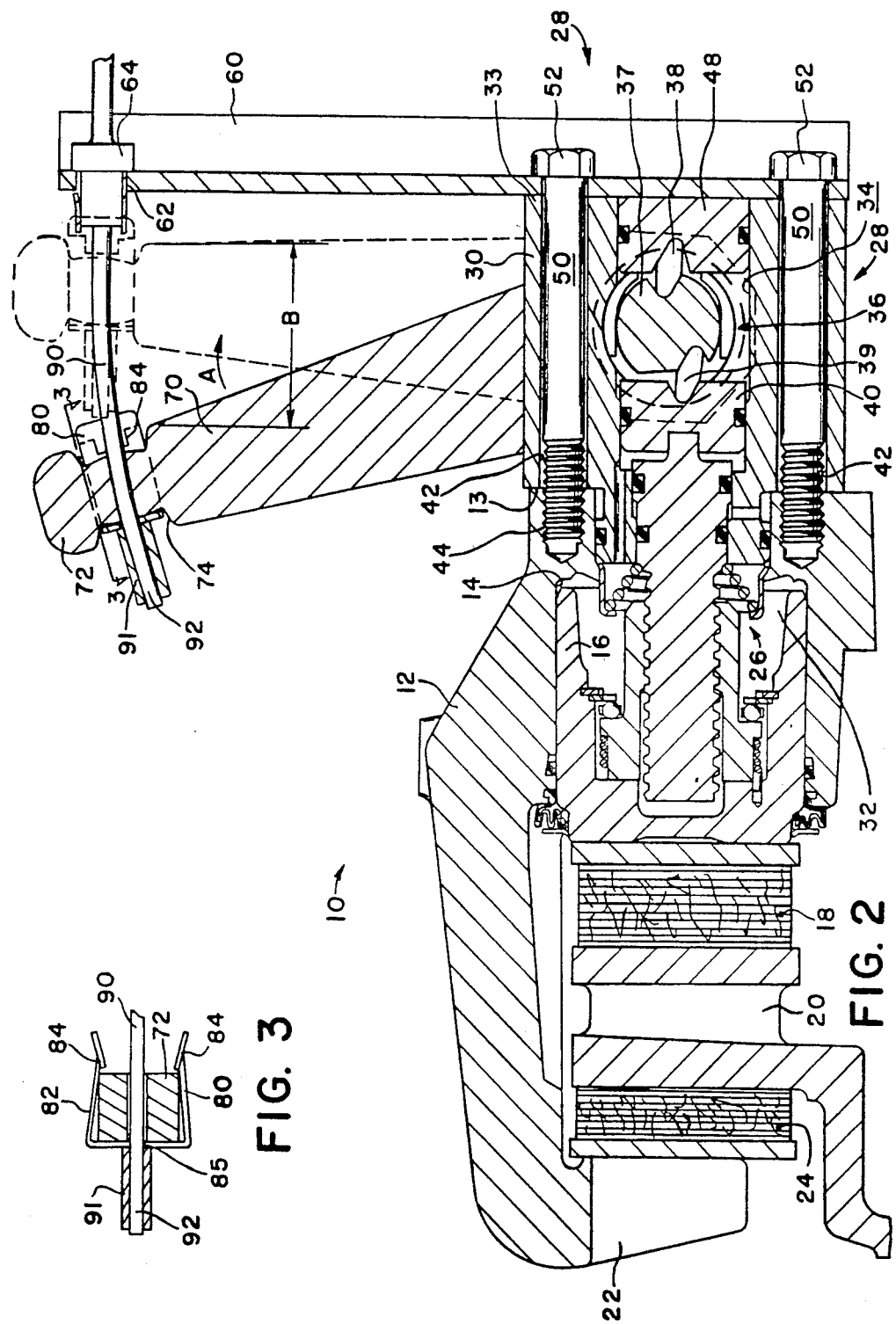

DISC BRAKE PARKING CARTRIDGE RETENTION DEVICE

This invention relates to a disc brake having a mechanical parking brake actuator attached thereto.

A disc brake comprises a caliper assembly having a bore with a piston assembly therein so that when fluid pressure is communicated to the bore during a service brake application, the caliper assembly engages the pair of friction elements with the rotor. Numerous parking brake devices have been developed in order to mechanically actuate the piston for a parking application. A parking brake application may be effected by various devices such as ball ramps or screw threads which mechanically actuate or bias the pair of friction elements into engagement with the disc. Such parking brake mechanical actuator devices include a double toggle device such as that disclosed in U.S. Pat. No. 4,544,045 entitled "Mechanical Actuator for a Disc Brake", and Ser. No. 576,512 entitled "A Disc Brake Assembly". U.S. Pat. No. 4,544,045 discloses a double toggle mechanical actuator device disposed within a bore of the caliper housing, one end of the bore being enclosed by a cap threadedly inserted into and received by the bore. U.S. patent application Ser. No. 576,512 discloses a double toggle device contained within a parking cartridge housing assembly which is received within the bore of the caliper housing and secured thereto by means of a snap ring. A bracket is attached to the top of the parking cartridge housing and provides support for a cable attached to lever arms of the mechanical actuator. It has been known to provide hydraulic cylinders which have long bolts that retain end caps over ends of the cylinders in order to carry the cylinder loads. However, it is desirable to provide a disc brake with a parking actuator mechanism contained within a separate parking cartridge housing that is easily attached to and removed from the caliper housing, wherein the cartridge housing can be made of a light weight material and relatively small size, and the parking cartridge housing attached to the caliper housing in such a manner that the cartridge housing does not have imposed thereon reaction forces created during actuation of the mechanical parking actuator. Thus, it is desirable to secure the parking cartridge housing to the caliper assembly in such a manner that the parking cartridge housing does not experience the reaction forces, and yet provide a parking cartridge housing that is easily assembled and removed so that the parking actuator mechanism may be handled as a unit.

The present invention comprises a disc brake having a mechanical parking actuator, the disc brake having a caliper assembly cooperating with at least one friction pad to engage the friction pad with the rotor, the caliper assembly including a caliper housing with a bore receiving a piston assembly which is movable in the bore to engage the friction pad with the rotor, a parking cartridge housing with an opening therein and attached to said caliper housing so that the opening is aligned with the bore, plug means disposed within the opening in order to enclose the opening at an end of the cartridge housing, a mechanical parking actuator disposed within said opening and bore, end enclosure means abutting against and extending across the end of the parking cartridge housing, and a plurality of securement devices each being secured at one end with the caliper housing and at the other end with the end enclosure means so that the end enclosure means and securement devices cooperate to receive reaction forces exerted against the plug means and transmit the forces directly to the caliper housing. The mechanical parking actuator comprises a pair of exterior levers which are displaced by means of a cable, with a retainer or pin securing together the cable and respective ends of the levers so that the levers move with the cable.

The invention will now be described with reference to the accompanying drawings, wherein:

FIG. 2 is a section view taken along view lines 2—2 of FIG. 1; and

FIG. 3 is a top section view of the retainer securing together the cable and respective ends of the levers.

Figure 1:
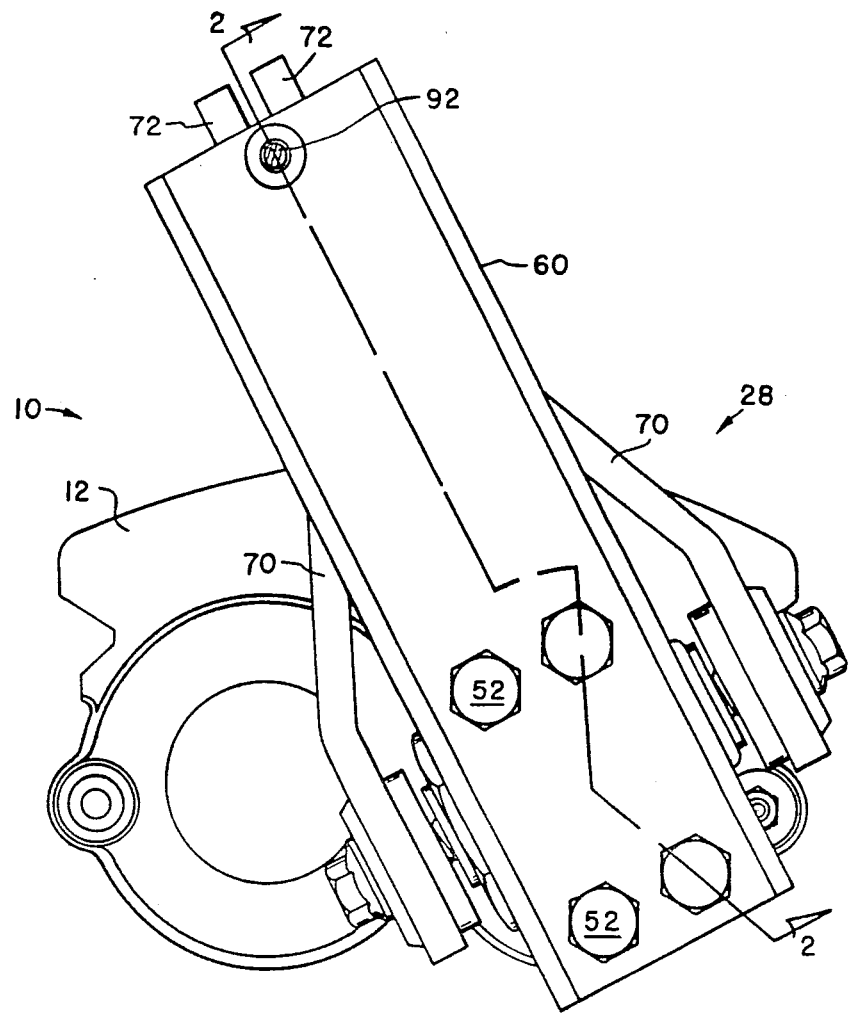
FIG. 1 is an end view of the disc brake and with parking cartridge device.

FIGS. 1 and 2 illustrate a disc brake 10 with a parking cartidge device 28 disposed at an end thereof. The disc brake includes a caliper housing 12 having a bore 14 with a piston 16 therein. Piston 16 engages friction pad 18 so that fluid communicated to bore 32 biases the piston 16 against friction pad 18 and rotor 20. As is well known in the art, reaction forces displace the caliper assembly so that caliper leg 22 displaces outer friction pad 24 against the other side of the rotor 20. Disc brake 10 includes a friction pad wear compensation mechanism 26 (of the type disclosed in application Ser. No. 576,512) disposed interiorily within the bore 32 and engaging the piston 16. Parking cartidge device 28 includes a parking cartridge housing 30 abutting end 13 of the caliper housing and having a through opening 34 with a double toggle mechanical parking actuator 36 therein. The double toggle mechanical parking actuator 36 engages at one end via toggle 38 an end plug 48 and at the other end via toggle 39 a piston 40, and is provided in accordance with the double toggle mechanical actuator disclosed in U.S. Pat. No. 4,544,045 and Ser. No. 576,512, each incorporated by reference herein. Parking cartridge housing 30 includes a plurality of longitudinal openings 42 for bolts 50 which extend therethrough and are threadedly received in threaded tappings 44 of caliper housing 12. Bolt heads 52 are secured against a bracket 60 which extends across end 33 of parking cartridge housing 30 so that bracket 60 captures end plug 48 within through opening 34. The bracket 60 extends upwardly to provide an opening 62 receiving cable bushing 64 therein. The double toggle mechanical actuator 36 includes a pair of lever arms 70 which extend adjacent the bracket 60 and are captured together by U-shaped retainer 80 that secures the lever arms together and captures cable end 92 therein. The cable 90 has a crimp member 91 at end 92 and the cable extends through retainer opening 85, lever arm ends 72 and bushing 64 for attachment to the parking brake lever (not shown). Lever arm ends 72 include recessed areas 74 which permit the U-shaped retainer 80 to be positioned relative to the lever arms, and retainer 80 includes inwardly directed fastening barbs 84 at the end of each leg 82, the fastening barbs engaging the sides of lever arms 70 so that the retainer is secured thereto. Lever arm ends 72 are held together and in position by the snap-on retainer 80, which also serves to secure the cable to the lever arms 70.

When the vehicle operator desires to set the parking brake, the parking brake lever (not shown) is operated and this displaces the operatively attached cable 90.

Cable 90 is displaced in the direction of Arrow A to move levers 70 to their dotted line position illustrated in FIG. 2. The cable is slidably journalled through the bushing 64, with bushing 64 fixedly positioned by the bracket 60. Rotation of lever arms 70 causes operation of the mechanical parking actuator 36. As the cam 37 rotates, the input reaction toggle 38 and the output toggle 39 are rotated therewith. The output toggle 39 causes lateral displacement of the piston 40 and connected friction pad wear compensation mechanism 26. This action causes a similar reaction through reaction toggle 38 which exerts reaction forces against the end plug 48. The end plug 48 is disposed directly against bracket 60 which receives all of the reaction forces and transmits them directly to the heads 52 of bolts 50. The bolts 50 transmit the reaction forces directly to their threaded ends secured in the threaded tappings 44 of caliper housing 12. Thus, reaction forces produced as a result of actuation of the parking brake mechanical parking actuator 36 are transmitted directly to the bracket 60, bolt heads 52, bolts 50, threaded tappings 44, and caliper housing 12, without the parking cartridge housing 30 being subjected to any of these reaction forces. As a result, parking cartridge housing 30 may be made of a much lighter weight material and of a generally smaller configuration since it is not subjected to reaction forces. Additionally, parking cartridge housing 30 provides an easily assembled and easily removed cartridge for the mechanical parking actuator 36 so that the entire assembly may be easily attached or removed for assembly or servicing. Also, the bolts can be loosened so that the piston 16 and parking cartridge device 28 can be pushed back for clearance between the disc and shoe linings, if such is desired. Another advantage is that end plug 48 may be simply inserted within opening 34. Previously, end plug 48 had threads thereon which were threadedly received in threads of the parking cartridge housing. As a result of plug 48 being captured within through opening 34 by means of bracket 60, the threaded connection between the parking cartridge housing and the plug has been eliminated, thus eliminating manufacturing costs and reducing disassembly time. Bolts 50 provide not only for the direct transmission of reaction forces to the caliper housing, but eliminate the previously used shear ring for retention of the parking cartridge housing to the caliper housing. This provides a more reliable and stronger connection of the parking cartridge housing to the caliper housing, in addition to providing a more readily removable connection. An additional significant advantage is that the end bracket 60 not only serves to transmit the reaction forces directly to the bolts which are attached to the caliper housing, but extends upwardly to provide positioning for the bushing 64 and cable 90. Instead of being a separate construction attached to the cartridge housing merely for the purpose of positioning the cable, the bracket serves the dual purposes of transmitting reaction forces and positioning the cable.

Double toggle mechanical parking actuator 36 has the pair of lever arms 70 rotated by cable 90. U-shaped retainer 80 captures together cable end 92 and lever arm ends 72 and eliminates a clevis pin bracket (see Ser. No. 576,512) utilized previously for securing the cable to the lever arms. As a result, the distance "B" between the at-rest position of lever arms 70 and bracket 60 has been substantially reduced because the clevis pin bracket is no longer positioned between the lever arms and bracket 60. Thus, the lever arms are positioned closer to the bracket and this reduces width and space requirements for the disc brake parking cartridge assembly.

Figure 4:
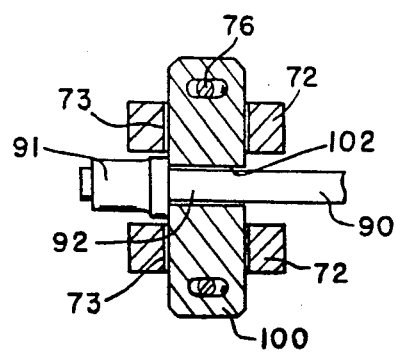
FIG. 4 is a top view of an alternative structure for securing together the cable and levers.

FIG. 4 illustrates an alternative method for attaching the cable 90 to the lever arm ends 72. Pin 100 extends through lever arm openings 73 and is maintained in position by cotter keys or pins 76. Pin 100 has a bore 102 receiving end 92 of cable 90, with crimp member 91 abutting pin 100. Pin 100 provides a very strong and reliable means for maintaining the cable attachment with the lever arms.

Although the present invention has been illustrated and described in connection with example embodiments, it will be understood that this is illustrative of the invention and is by no means restrictive thereof. It is reasonably to be expected that those skilled in the art can make numerous revisions and additions to the invention and it is intended that such revisions and additions will be included in the scope of the following claims as equivalents of the invention.

What is claimed is:

1. A disc brake having a parking cartridge device, comprising a caliper assembly cooperating with at least one friction pad to engage the friction pad with a rotor, the caliper assembly including a caliper housing with a bore receiving a piston assembly movable within the bore to engage the friction pad with the rotor, a parking cartridge housing having a through opening and secured to the caliper assembly so that said through opening is aligned with said bore, mechanical actuator means disposed in said bore and opening, end plug means disposed at an end of said cartridge housing in order to enclose the through opening, a bracket disposed over the end of said parking cartridge housing, and a plurality of securement devices each attached securely at one end with said caliper and at the other end with said bracket so that the plurality of securement devices and bracket cooperate to secure the parking cartridge housing to the caliper and capture the end plug means within the through opening, the mechanical actuator means developing reaction forces during actuation thereof and the reaction forces transmitted via said end plug means, bracket, and securement devices to the caliper housing.

2. The disc brake with a parking cartridge device in accordance with claim 1, wherein the mechanical actuator means comprises a dual toggle parking actuator device, the plug means having an opening for movably receiving one of the toggles therein, the reaction forces being exerted by the one toggle on the plug means, bracket, securement means, and caliper housing.

3. The disc brake with a parking cartridge device in accordance with claim 2, wherein the mechanical actuator means further comprises a pair of exterior levers secured to a cable for movement therewith.

4. The disc brake with a parking cartridge device in accordance with claim 3, wherein said levers and cable are secured together by a pin.

5. The disc brake with a parking cartridge device in accordance with claim 3, wherein said pair of exterior levers and cable are secured together by means of a retainer which attaches the cable to said levers and secures the levers together.

6. The disc brake with a parking cartridge device in accordance with claim 5, wherein said retainer comprises a U-shaped retainer having an opening for receiving said cable and each leg of the retainer having a fastening barb for engaging a respective lever.

7. The disc brake with a parking cartridge device in accordance with claim 6, wherein the bracket extends adjacent said levers and includes a bracket opening through which said cable extends, the bracket opening having means for maintaining the position of said cable so that said cable may move therethrough during operation of said mechanical actuator.

8. A disc brake with a parking cartridge device, comprising a caliper assembly cooperating with at least one friction pad to engage the friction pad with a rotor, the caliper assembly including a housing with a bore receiving a piston assembly movable in the bore to engage the friction pad with the rotor, a parking cartridge housing having an opening and attached to the caliper and the opening aligned with the bore of the caliper, and a mechanical actuator disposed in said bore and opening for mechanically displacing said piston assembly, characterized in that said parking cartridge housing comprises longitudinal attachment means extending from one end of the parking cartridge housing to the other end of the parking cartridge housing, and end enclosure means extending transversely to said opening and the one end of said parking cartridge housing and receiving the attachment means thereat, the attachment means engaging fixedly the end enclosure means at the one end and the caliper housing at the other end so that the attachment means and end enclosure means cooperate to receive reaction forces from said mechanical actuator and transmit the reaction forces to the caliper housing, the mechanical actuator including exterior lever means, a cable connected with the lever means, and a snap-on retainer for securing the cable to said lever means, the lever means comprising a pair of lever arms captured between said retainer so that the arms are held in position and in engagement with the cable, the retainer being U-shaped and each leg thereof having an inwardly directed fastening barb which engages a portion of an associated lever arm in order to maintain said U-shaped retainer in engagement with said arms.

9. The disc brake with a parking cartridge device in accordance with claim 8, wherein said retainer includes an opening for receiving the cable therein.

10. A disc brake with a parking cartridge device, comprising a caliper assembly cooperating with at least one friction pad to engage the friction pad with a rotor, the caliper assembly including a housing with a bore receiving a piston assembly movable in the bore to engage the friction pad with the rotor, a parking cartridge housing having an opening and attached to the caliper and the opening aligned with the bore of the caliper, and a mechanical actuator disposed in said bore and opening for mechanically displacing said piston assembly, characterized in that the brake includes said parking cartridge housing having longitudinal attachment means extending from one end of the parking cartridge housing to the other end of the parking cartridge housing, and an end enclosure extending transversely to and over said opening at the one end of said parking cartridge housing and receiving the attachment means thereat, the attachment means engaging fixedly the end enclosure at the one end and the caliper housing at the other end so that the attachment means and end enclosure cooperate to receive reaction forces from said mechanical actuator and transmit the reaction forces to the caliper housing without imposing said reaction forces on the cartridge housing.

11. The disc brake with a parking cartridge device in accordance with claim 10, wherein the parking cartridge housing includes longitudinal through openings extending therethrough and the attachment means received within respective longitudinal through openings.

12. The disc brake with a parking cartridge device in accordance with claim 10, wherein the end enclosure comprises a bracket having a plurality of holes receiving the attachment means therein.

13. The disc brake with a parking cartridge device in accordance with claim 10, wherein the end enclosure provides support for a cable operatively attached to said mechanical actuator.

14. The disc brake with a parking cartridge device in accordance with claim 10, wherein the parking cartridge housing includes end plug means enclosing said one end of the parking cartridge housing, the plug means being captured within the opening by means of said attachment means and said end enclosure.

15. The disc brake with a parking cartridge device in accordance with claim 10, wherein the mechanical actuator includes a pair of lever arms having a pin extending therebetween to secure a cable to said arms.

16. The disc brake with a parking cartridge device in accordance with claim 10, wherein the mechanical actuator includes exterior lever means, a cable connected with the lever means, and a snap-on retainer for securing the cable to said lever means.

17. The disc brake with a parking cartridge device in accordance with claim 16, wherein the lever means comprises a pair of lever arms which are captured between said retainer so that the arms are held in position and in engagement with said cable.

18. The disc brake with a parking cartridge device in accordance with claim 17, wherein the lever arms each include a reduced width area at one end thereof which receives the retainer therein to fixedly position the retainer relative to the arms.

19. A disc brake with a parking cartridge device, comprising a caliper assembly cooperating with at least one friction pad to engage the latter with a rotor, the caliper assembly including a caliper housing with a bore receiving a piston assembly movable in the bore to engage the friction pad with the rotor, a parking cartridge housing having an opening and attached to the caliper housing so that the opening is aligned with said bore, and a mechanical actuator disposed within said opening and bore, characterized in that said brake comprises an end member disposed at one end of said parking cartridge housing, a plurality of securement devices each attached at one end to said end member and at the other end to said caliper housing, the mechanical actuator comprising a pair of levers extending therefrom to a cable for actuation and displacement of said levers, and a retainer securing together the cable and respective ends of said levers, the retainer comprising a U-shaped retainer which provides securement of the cable relative to the levers and couples together the ends of the levers.

20. The disc brake with a parking cartridge device in accordance with claim 19, wherein legs of the U-shaped retainer each have an inwardly directed fastening barb for engaging the associated lever in order to secure the retainer to the levers.

21. A disc brake with a parking cartridge device, comprising a caliper assembly cooperating with at least one friction pad to engage the latter with a rotor, the caliper assembly including a caliper housing with a bore receiving a piston assembly movable in the bore to engage the friction pad with the rotor, a parking cartridge housing having an opening and attached to the caliper housing so that the opening is aligned with said bore, and a mechanical actuator disposed within said opening and bore, characterized in that said brake comprises an end member disposed over and covering one end of the opening of said parking cartridge housing, a plurality of securement devices each attached at one device end to said end member and at the other device end to said caliper housing, the mechanical actuator transmitting reaction forces to the end member, securement devices, and caliper housing without imposing said reaction forces on the cartridge housing, the mechanical actuator comprising a pair of levers extending therefrom to a cable for actuation and displacement of said levers, and a retainer securing together the cable and respective ends of said levers.

22. The disc brake with a parking cartridge device in accordance with claim 21, wherein the end member comprises a bracket extending adjacent the levers and including a bracket opening with means for slidably receiving the cable therein, the bracket and slidable receiving means providing positioning for said cable which is connected with the levers.

* * * * *